United States Patent
Castelain

(10) Patent No.: US 9,614,634 B2
(45) Date of Patent: Apr. 4, 2017

(54) METHOD AND DEVICE FOR CANCELLING A NARROW BAND INTERFERENCE IN A SINGLE CARRIER SIGNAL AND COMPUTER PROGRAM

(71) Applicant: MITSUBISHI ELECTRIC CORPORATION, Tokyo (JP)

(72) Inventor: Damien Castelain, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 56 days.

(21) Appl. No.: 14/638,683

(22) Filed: Mar. 4, 2015

(65) Prior Publication Data

US 2015/0280848 A1    Oct. 1, 2015

(30) Foreign Application Priority Data

Mar. 31, 2014   (EP) ..................................... 14162822

(51) Int. Cl.
| | |
|---|---|
| *H04J 11/00* | (2006.01) |
| *H04L 25/03* | (2006.01) |
| *H04L 25/02* | (2006.01) |
| *H04B 17/345* | (2015.01) |

(52) U.S. Cl.
CPC ........ *H04J 11/0066* (2013.01); *H04B 17/345* (2015.01); *H04L 25/022* (2013.01); *H04L 25/0228* (2013.01); *H04L 25/03159* (2013.01); *H04L 2025/03414* (2013.01); *H04L 2025/03598* (2013.01)

(58) Field of Classification Search
CPC ............ H04J 11/0066; H04L 25/03159; H04L 25/0228; H04L 25/022; H04L 2025/03414; H04L 2025/03598; H04B 17/345

See application file for complete search history.

(56) References Cited

U.S. PATENT DOCUMENTS

| | | | | |
|---|---|---|---|---|
| 2008/0207156 A1* | 8/2008 | Aytur | .................... | H04L 5/0062 455/307 |
| 2009/0010366 A1* | 1/2009 | Wu | ....................... | H04B 1/7102 375/346 |
| 2014/0269361 A1* | 9/2014 | Asokan | ................. | H04W 24/06 370/252 |

* cited by examiner

*Primary Examiner* — Gbemileke J Onamuti
(74) *Attorney, Agent, or Firm* — Birch, Stewart, Kolasch & Birch, LLP

(57) ABSTRACT

The present invention concerns a method for cancelling a narrow band interference in a single carrier signal. The method comprises the steps executed by a receiver of:
receiving the single carrier signal and transforming the single carrier signal into received symbols,
transforming the received symbols from the time domain to the frequency domain into received symbols in the frequency domain,
determining a signal and thermal noise power estimation based on the received symbol powers in the frequency domain,
estimating variances of the narrow hand interference from the signal and thermal noise power estimation and the received symbol powers in the frequency domain,
equalizing the received symbols in the frequency domain or symbols derived from the received symbols in the frequency domain taking into account the estimate of the variances of the narrow band interference.

14 Claims, 7 Drawing Sheets

METHOD AND DEVICE FOR CANCELLING A NARROW BAND INTERFERENCE IN A SINGLE CARRIER SIGNAL AND COMPUTER PROGRAM

BACKGROUND OF THE INVENTION

1. Field of the Invention

The present invention relates generally to a method and a device for cancelling a narrow band interference in a single carrier signal representative of received symbols.

The present invention is related to narrow band interferer cancellation in telecommunication systems based on single carrier modulation the demodulation of which is implemented in the frequency domain.

For example and in a non limitative way, the present invention may be applied to single carrier orthogonal frequency division multiplex modulation scheme (SC-OFDM).

2. Description of the Related Art

SC-OFDM is a modulation scheme with OFDM-type multiplexing but single-carrier-like envelope. It can be implemented either in the time-domain or in the frequency-domain. In the last case, it is also called (Discrete Fourier Transform) DFT-spread OFDM, or SC-FDE (Single Carrier Frequency Domain Equalisation) or SC-FDMA (Single Carrier Frequency Division Multiple Access). The frequency domain implementation is generally preferred, especially in the receiver.

SUMMARY OF THE INVENTION

The present invention may be applied to Single Carrier Time Division Multiplex (SC-TDM) if equalization is performed in the frequency domain.

The present invention finds application into wireless cellular telecommunication networks like 3GPP/LTE uplink transmission or broadcasting system like Digital Video Broadcasting Next Generation Handheld (DVB NGH) systems and satellite communication systems.

The present invention aims at providing a method and a device which enable the cancellation of at least one narrow band interference in a single carrier signal.

To that end, the present invention concerns a method for cancelling a narrow band interference in a single carrier signal, characterized in that the method comprises the steps executed by a receiver of:
receiving the single carrier signal and transforming the single carrier signal into received symbols,
transforming the received symbols from the time domain to the frequency domain into received symbols in the frequency domain,
determining a signal and thermal noise power estimation based on the received symbol powers in the frequency domain,
estimating variances of the narrow band interference from the signal and thermal noise power estimation and the received symbol powers in the frequency domain,
equalizing the received symbols in the frequency domain or symbols derived from the received symbols in the frequency domain taking into account the estimate of the variances of the narrow band interference.

The present invention also concerns a device for cancelling a narrow band interference in a single carrier signal, characterized in that the device is included in a receiver and comprises:
means for receiving the single carrier signal and transforming the single carrier signal into received symbols,
means for transforming the received symbols from the time domain to the frequency domain into received symbols in the frequency domain,
means for determining a signal and thermal noise power estimation based on the received symbol powers in the frequency domain,
means for estimating variances of the narrow band interference from the signal and thermal noise power estimation and the received symbol powers in the frequency domain,
means for equalizing the received symbols in the frequency domain or symbols derived from the received symbols in the frequency domain taking into account the estimate of the variances of the narrow band interference.

Thus, the amount of interference in received symbols is estimated for each frequency i.e. for each carrier index, the equalization is improved when interference is present and the overall performance of the receiver is improved when interference is present.

According to a particular feature, the receiver:
determines weighting coefficients which are dependant of the variances of the narrow band interference, the weighting coefficients being decreasing functions of the variances of the narrow band interference,
equalizes the received symbols in the frequency domain taking into account the weighting coefficients.

Thus, the equalization uses the information on the interference in a simple manner and the complexity is reduced.

According to a particular feature, the weighting coefficients are equal to one or null value, which depends on the estimated variances of the narrow band interference.

Thus, the complexity of the equalization is further decreased.

According to a particular feature, the receiver:
estimates the frequency-dependent received powers of received symbols in the frequency domain,
determines iteratively the signal and thermal noise power from the estimated frequency dependent receive powers.

Thus, the signal and thermal noise power is simply and efficiently estimated, the complexity remains low and the performance is improved.

According to a particular feature, the adaptive signal and thermal noise power iteratively determined is determined by:
executing a first averaging of the total received powers of the received symbols in the frequency domain,
determining, at a first iteration, a threshold based on the averaged total received power,
truncating all powers of the received symbols in the frequency domain which are upper than the determined threshold at the first iteration,
executing a second averaging of the truncated powers,
correcting the second average by a correction coefficient,
determining at a following iteration a following adaptive threshold based on the corrected average,
truncating all powers which are upper than the following adaptive threshold,
executing a third averaging of the truncated powers,
correcting the third average by a correction coefficient,
and executing a predetermined number of times, the adaptive threshold determination, the truncating, the third averaging and the correcting.

Thus, the signal and thermal noise power excluding the interference power is simply and efficiently estimated, the correction coefficient insures that the signal plus noise power is not underestimated when no interference is present, the complexity remains low and the performance is improved when interference is present.

According to a particular feature, the receiver determines a first threshold based on the signal and thermal noise power and the first threshold is used for estimating the variances of the narrow band interference.

Thus, the variances are simply estimated and the complexity remains low.

According to a particular feature, the correction coefficients are calculated assuming that the symbols the powers of which are truncated follow a complex Gaussian law.

Thus, at each iteration the power loss due to the truncation is compensated by the correction coefficient if no interference is present, and no degradation occurs when no interference is present.

According to a particular feature, the correction coefficients are determined using a lookup table.

Thus, the correction coefficients are easily determined without any additional computation.

According to a particular feature, the receiver performs a channel estimation based on the received symbols in the frequency domain.

Thus, the channel is estimated, and the equalization can use this estimation for improving the performance of the receiver.

According to a particular feature, the receiver:
determines a second threshold based on the signal and thermal noise power estimate,
truncates the amplitudes of the received symbols in the frequency domain at the determined second threshold, the truncated received symbols in the frequency domain being the symbols derived from the received symbols.

Thus, the amount of interference in received symbols that are representative of data and/or pilot symbols is reduced.

According to a particular feature, the channel estimation is performed on the truncated received symbols in the frequency domain.

Thus, the channel estimation performance is improved and the overall performance of the receiver is improved.

According to a particular feature, the single carrier signal is a single carrier orthogonal frequency division multiplex modulation signal.

Thus, the frequency domain implementation of the demodulation is facilitated by dedicated header or prefix.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and apparatus according to the invention, they will not be repeated here.

BRIEF DESCRIPTION OF THE DRAWINGS

The characteristics of the invention will emerge more clearly from a reading of the following description of an example of embodiment, the said description being produced with reference to the accompanying drawings, among which.

DETAILED DESCRIPTION OF THE INVENTION

Figure 1:
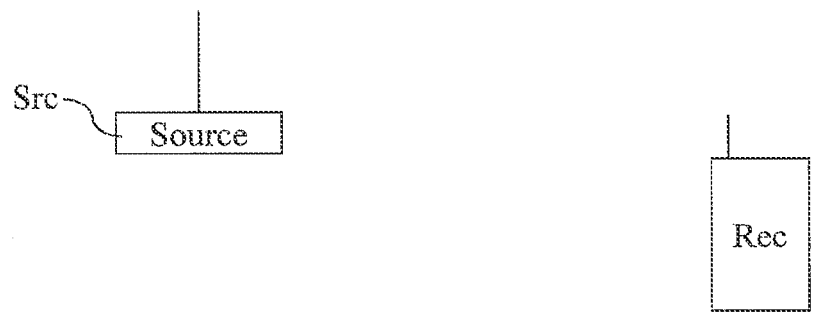
FIG. 1 represents a wireless link in which the present invention is implemented.

FIG. 1 represents a wireless link in which the present invention is implemented.

The present invention will be disclosed in an example in which the signals transferred by a source Src are transferred to at least one receiver Rec.

Only one receiver Rec is shown in the FIG. 1 for the sake of simplicity, but signals may be received by a more important number of receivers Rec.

The receiver Rec may be included in a fixed or mobile terminal to which data like video signals are transferred.

Data and possibly information enabling an estimate of the wireless link between a source and a one receiver are transferred using single carrier modulation According to the invention, the receiver Rec:
receives the single carrier signal and transforms the single carrier signal into received symbols,
transforms the received symbols from the time domain to the frequency domain into received symbols in the frequency domain,
determines a signal and thermal noise power estimation based on the received symbol powers in the frequency domain,
estimates variances of the narrow band interference from the signal and thermal noise power estimation and the received symbol powers in the frequency domain,
equalizes the received symbols in the frequency domain or symbols derived from the received symbols in the frequency domain taking into account the estimate of the variances of the narrow band interference.

Figure 2:
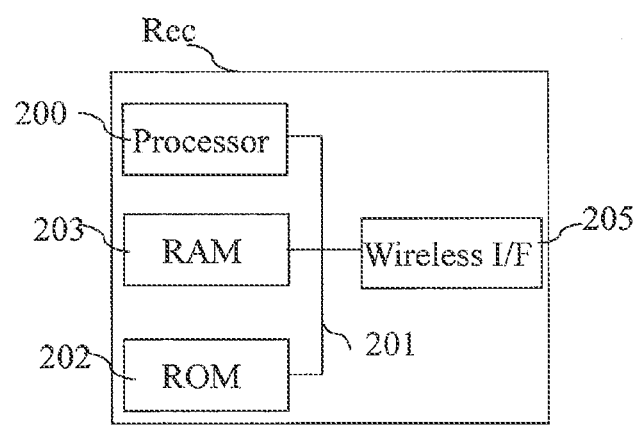
FIG. 2 is a diagram representing the architecture of a receiver in which the present invention is implemented.

FIG. 2 is a diagram representing the architecture of a receiver in which the present invention is implemented.

Figure 6A:
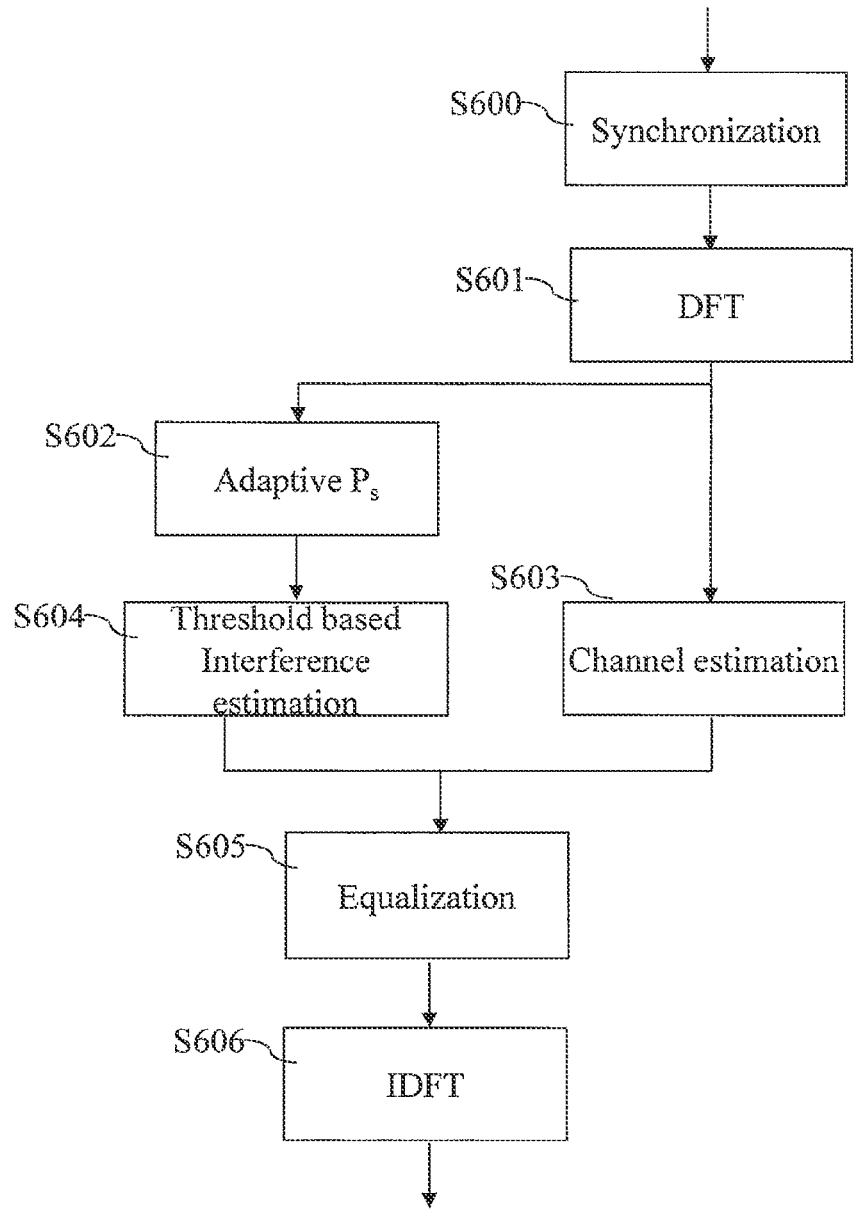
FIG. 6a discloses an example of an algorithm executed by a destination according to the first mode of realization of the present invention.
Figure 6B:
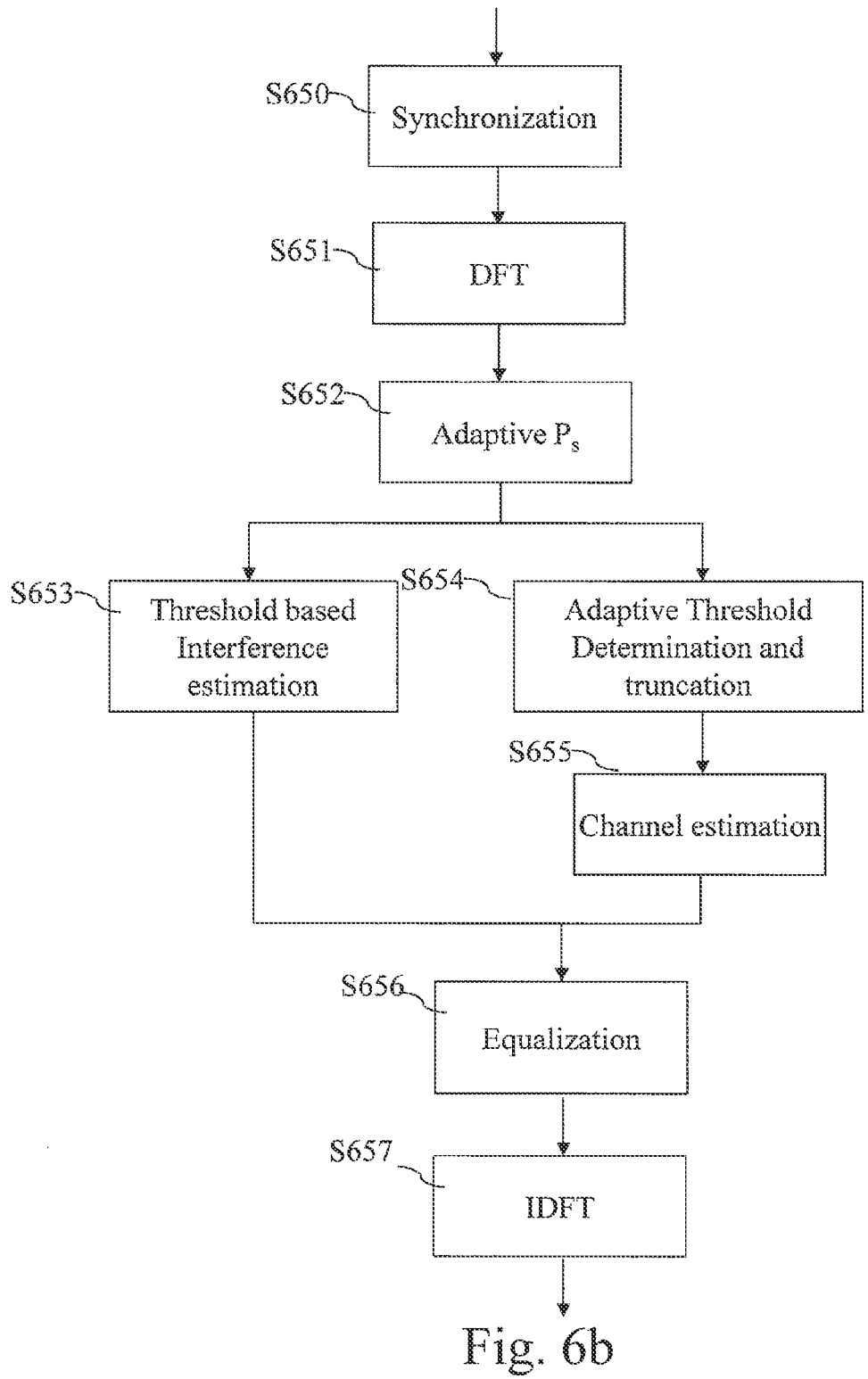
FIG. 6b discloses an example of an algorithm executed by a destination according to the second mode of realization of the present invention.

The receiver Rec has, for example, an architecture based on components connected together by a bus 201 and a processor 200 controlled by the program as disclosed in FIG. 6a or 6b.

It has to be noted here that the receiver Rec may have an architecture based on dedicated integrated circuits.

The bus 201 links the processor 200 to a read only memory ROM 202, a random access memory RAM 203 and a wireless interface 205.

The memory 203 contains registers intended to receive variables and the instructions of the program related to the algorithm as disclosed in FIG. 6a or 6b.

The processor 200 controls the operation of the wireless interface 205.

The read only memory 202 contains instructions of the program related to the algorithm as disclosed in FIG. 6a or 6b, which are transferred, when the receiver Rec is powered on, to the random access memory 203.

Any and all steps of the algorithms described hereafter with regard to FIG. 6a or 6b, may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

In other words, the receiver Rec includes circuitry, or a device including circuitry, causing the receiver Rec to perform the steps of the algorithms described hereafter with regard to FIG. 6a or 6b.

Such a device including circuitry causing the receiver Rec to perform the steps of the algorithm described hereafter with regard to FIG. 6a or 6b may be an external device connectable to the receiver Rec.

Figure 3A:
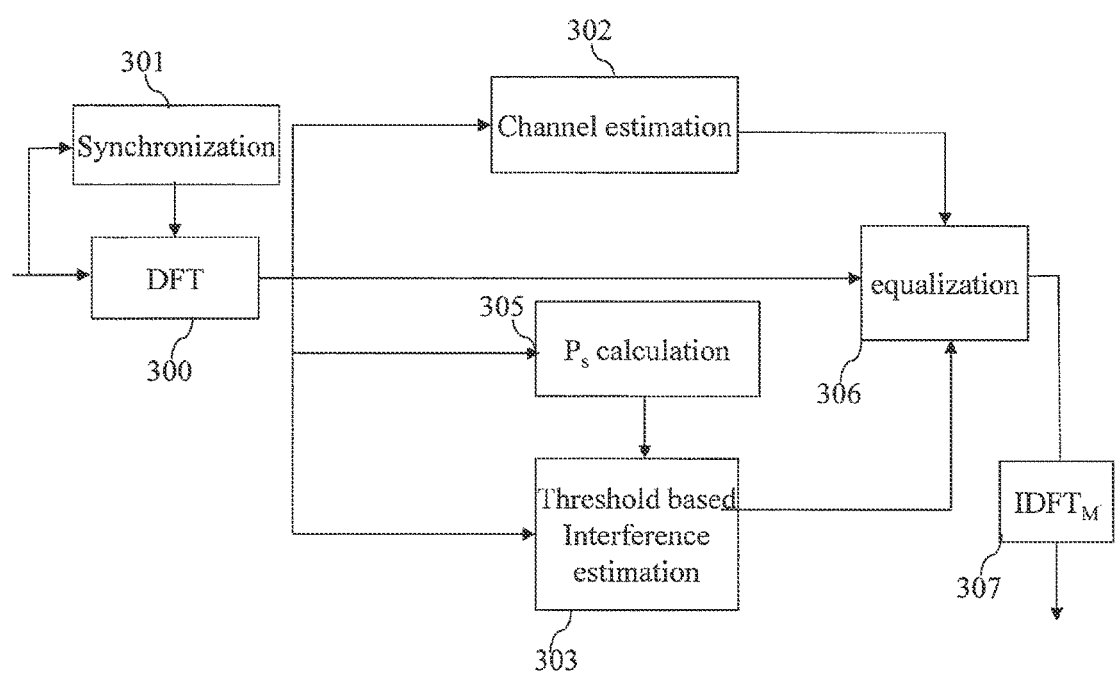
FIG. 3a discloses a block diagram of components of the wireless interface of the receiver according to a first mode of realization of the present invention.
Figure 3B:
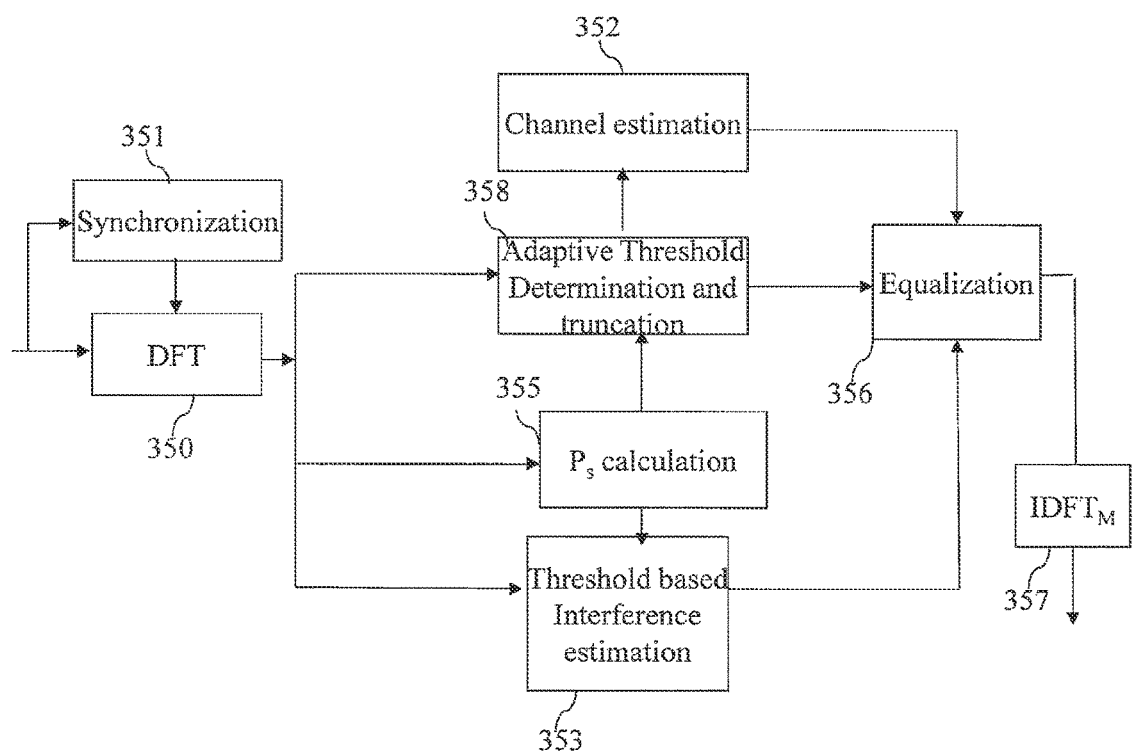
FIG. 3b discloses a block diagram of components of the wireless interface of the receiver according to a second mode of realization of the present invention.

The wireless interface 205 comprises components as disclosed in FIG. 3a or 3b.

FIG. 3a discloses a block diagram of components of the wireless interface of the receiver according to a first mode of realization of the present invention.

The wireless interface 205 comprises a synchronization module 301 which is in charge of synchronizing a DFT module 300 of the wireless interface 205 on the received symbols.

The DFT module 300 transforms the received symbols from the time domain to the frequency domain into received symbols in the frequency domain $y_k$ where k denotes the index of carrier. The received symbols are obtained by transforming the received single carrier signal into received symbols.

The received symbols in the frequency domain may be represented by:

$$y_k = h_k x_k + v_k$$

Where $h_k$ is the channel response for carrier of index k, and where $v_k$ is the additive noise at the same frequency. The term $v_k$ is the addition of the Additive White Gaussian Noise (AWGN) e.g. the thermal noise and the narrow band interferer. Because of the narrow band interferer, the variance of $v_k$ is frequency-dependent and is denoted by $\sigma_k^2$.

The received symbols in the frequency domain are provided to an adaptive signal and thermal noise power estimation module 305, to a threshold based interference estimation module 303, to a channel estimation module 302 and to an equalization module 306.

The adaptive signal and thermal noise power estimation module 305 provides an estimate of the signal and thermal noise power noted $P_s$ to the threshold based interference estimation module 303.

For example, the threshold based interference estimation module 303, for each carrier of index k, estimates a rough interferer variance $\omega_k$ that the equalization module uses. The variance is calculated from the received power $p_k$ and from a threshold $T_a$ calculated from the signal and thermal noise power estimation $P_s$.

For example, $T_a = P_s + x$ dB, with x being from 0 to a few dB like at most 10 dB.

For example, $\omega_k = \max(0, p_k - T_a)$.

This information representative of narrow band interference is provided to the equalization module 306.

The rough variance $\omega_k$ is used by the equalization module 306 which equalizes in different ways.

The equalization module 306 may be a Minimum Mean Square Error equalization (MMSE).

For example, the rough variance $\omega_k$ may be used in the MMSE equalisation as follows:

$$z_k = \frac{h_k^*}{|h_k|^2 + \sigma^2 + \omega_k} y_k$$

Where $\sigma^2$ is an estimation of the thermal noise variance, where $h_k^*$ denotes the conjugate of the estimated channel for carrier k.

It has to be noted here that $\sigma^2$ may be set up to a predetermined value.

For example, the rough variance $\omega_k$ may be used for determining a weighting coefficient $\lambda_k$ that is applied to received symbols in the frequency domain $y_k$ prior to or after the equalisation.

If the equalization is a MMSE equalization:

$$z_k = \frac{h_k^*}{|h_k|^2 + \sigma^2} \lambda_k y_k$$

It has to be noted here that $\lambda_k$ is a decreasing function of $\omega_k$. As an example, $\lambda_k$ is:

$$\lambda_k = \frac{a}{b + \omega_k}$$

Where, for example, $a = b = 2P_s$.

For example, $\lambda_k$ takes only two values, 0 and 1, depending on the values of $\omega_k$, or which is equivalent here, depending on the relative value of $p_k$ with respect to the adaptive threshold $T_a$.

$$\begin{cases} \lambda_k = 0 & \text{if } \omega_k > 0 \text{ i.e. if } p_k > T_a \\ \lambda_k = 1 & \text{elsewhere} \end{cases}$$

$\lambda_k = 0$ corresponds to positions of the narrow band interferer and equalized symbols at these carriers are set to null value.

According to the present invention, by providing information related to interference prior to an equalization like for example and in a non limitative way a Minimum Mean Square Error (MMSE) equalization, the overall performance of the reception is improved when narrow band interference is present.

For each carrier k, the output $\omega_k$ or $\lambda_k$ of the threshold based interference estimation module 303 is provided to the equalization module 306.

The channel estimation module 302 performs a channel estimation, for example based on pilot symbols.

The output of the equalization module 306 is provided to an IDFT (Inverse Discrete Fourier Transform) module 307 which may have a different size than the DFT module 300.

Classical equalization process, in particular MMSE assumes a perfect knowledge of the channel and a perfect knowledge of the narrow band interferer variance. The narrow band interference variances are simply estimated by the present invention. However, the channel estimation process is sensitive to the interferers. It must be noted that the interferer power can be much larger than the signal power.

Figure 4:
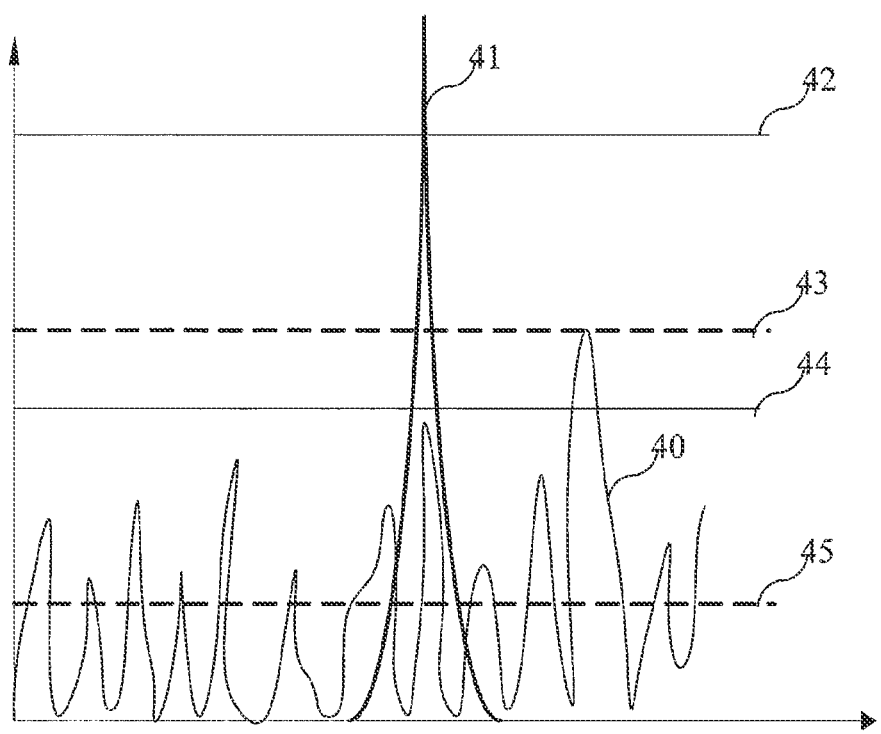
FIG. 4 represents an example of a received signal with narrow band interference.

An example of interferer i.e. narrow band interference is given in reference to the FIG. 4.

FIG. 3b discloses a block diagram of components of the wireless interface of the receiver according to a second mode of realization of the present invention.

The wireless interface 205 comprises a synchronisation module 351 which is in charge of synchronising a DFT module 350 of the wireless interface 205 on the received symbols.

The DFT module 350 transforms the received symbols from the time domain to the frequency domain into received symbols in the frequency domain $y_k$ where k denotes the index of carrier. The received symbols are obtained by transforming the received single carrier signal into received symbols.

The received symbols in the frequency domain may be represented by:

$$y_k = h_k x_k + \upsilon_k$$

Where $h_k$ is the channel response for carrier of index k, and where $\upsilon_k$ is the additive noise at the same frequency. The term $\upsilon_k$ is the addition of the Additive White Gaussian Noise (AWGN) noise e.g. the thermal noise and the narrow band interferer. Because of the narrow band interferer, the variance of $\upsilon_k$ is frequency-dependent and is denoted by $\sigma_k^2$.

The received symbols in the frequency domain are provided to an adaptive signal and thermal noise power estimation module 355, to a threshold based interference estimation module 353 and are provided to a adaptive threshold determination and truncation module 358.

The channel estimation is for example based on pilot symbols.

The adaptive signal and thermal noise power estimation module 355 provides an estimate of the signal and thermal noise power noted $P_s$ to the threshold based interference estimation module 353.

The adaptive signal and thermal noise power estimation module 355 provides an estimate of the signal and thermal noise power noted $P_s$ to the adaptive threshold determination and truncation module 358.

The adaptive threshold determination and truncation module 358 determines another threshold $T_d$ as equal, for example to the power $P_s$ determined plus four dB.

The threshold $T_d$ is then used by the adaptive threshold determination and truncation module 358 to truncate the amplitudes of the received symbols in the frequency domain according to the following rule:

$$y_k = \rho_k e^{i\phi_k} \text{ if } \rho_k^2 < T_d$$

$$y_k = \sqrt{T_d} e^{i\phi_k} \text{ if } \rho_k^2 \geq T_d$$

where i is the square root of '−1' in both above mentioned formulas.

The received symbols processed by the adaptive threshold determination and truncation module 358 are then provided to the channel estimation module 352 and to the equalization module 356.

For example, the threshold based interference estimation module 353, for each carrier of index k, estimates a rough interferer variance $\omega_k$ that the equalization module uses. The variance is calculated from the received power $p_k$ and from a threshold $T_a$ calculated from the signal and thermal noise power estimation $P_s$.

For example, $T_a = P_s + x$ dB, with x being from 0 to a few dB like at most 10 dB.

For example, $\omega_k = \max(0, p_k - T_a)$.

This information representative of narrow band interference is provided to the equalization module 356.

The rough variance $\omega_k$ is used by the equalization module 356 which equalizes in different ways.

The equalization module 356 may be a Minimum Mean Square Error equalization (MMSE).

For example, the rough variance $\omega_k$ may be used in the MMSE equalisation as follows:

$$z_k = \frac{h_k^*}{|h_k|^2 + \sigma^2 + \omega_k} y_k$$

Where $\sigma^2$ is an estimation of the thermal noise variance, where $h_k^*$ denotes the conjugate of the estimated channel for carrier k provided by the estimation module which performs channel estimation on the received symbols processed by the adaptive threshold determination and truncation module 358.

It has to be noted here that $\sigma^2$ may be set up to a predetermined value.

For example, the rough variance $\omega_k$ may be used for determining a weighting coefficient $\lambda_k$ that is applied to received symbols in the frequency domain $y_k$ prior to or after the equalisation.

If the equalization is a MMSE equalization:

$$z_k = \frac{h_k^*}{|h_k|^2 + \sigma^2} \lambda_k y_k$$

It has to be noted here that $\lambda_k$ is a decreasing function of $\omega_k$. As an example, $\lambda_k$ is:

$$\lambda_k = \frac{a}{b + \omega_k}$$

Where, for example, $a = b = 2P_s$

For example, $\lambda_k$ takes only two values, 0 and 1, depending on the values of $\omega_k$, or which is equivalent here, depending on the relative value of $p_k$ with respect to the adaptive threshold $T_a$.

For example:

$$\begin{cases} \lambda_k = 0 & \text{if } \omega_k > 0 \text{ i.e. if } p_k > T_a \\ \lambda_k = 1 & \text{elsewhere} \end{cases}$$

$\lambda_k = 0$ corresponds to positions of the narrow band interferer and equalized symbols at these positions at set to null value.

For each carrier k, the output $\omega_k$ or $\lambda_k$ of the threshold based interference estimation module 353 is provided to the equalization module 356.

The output of the equalization module 356 is provided to an IDFT module 357 which may have a different size than the DFT module 350.

Classical equalization process, in particular MMSE, assumes a perfect knowledge of the channel and a perfect knowledge of the narrow band interferer variance. The narrow band interference variances are simply estimated by the present invention. However, the channel estimation process is sensitive to the interferers. It must be noted that the interferer power can be much larger than the signal power.

FIG. 4 represents an example of a received signal with narrow band interference.

The received signal with narrow band interference is represented in the frequency domain, i.e. once the DFT module 300 or 350 transforms the received symbols from the time domain to the frequency domain.

The horizontal axis represents the frequency and the vertical axis represents the power of signals received in the frequency bands.

The interference power 43 may be much larger than the signal and thermal noise power 45. If the interferer 41 is a pure sine, a good reception may be obtained with a signal over interference power ratio C/I of −10 dB, i.e. with an interferer ten times more powerful than the signal.

The present invention aims to determine a threshold such that signal above the threshold is more likely a dominating narrow band interference while signal below the threshold is more likely corresponding to signal plus thermal noise.

If the receiver sets up a threshold according to the received power Pt noted 43, the threshold 42 would be rather inefficient if the interferer power is large as the threshold would be much higher than the signal plus noise power 45.

If the signal and thermal noise power 45 called Ps is known, then the threshold $T_a$ noted 44 of about Ps+4 dB provides good performance. If the receiver Rec only knows the total power Pt, in order to be sure not to degrade the signal if there is no interferer, the receiver Rec must use a threshold of about T'=Pt+4 dB noted 42. If the interferer is high, Pt is much larger than Ps, and the threshold T' 42 is much larger than the optimum threshold T 44.

Therefore, the present invention estimates Ps prior defining the threshold $T_a$ and optionally the threshold $T_d$.

The estimation is based on the frequency-dependent received power $P_k$.

For estimating the frequency-dependent received power $p_k$, the present invention may be implemented on a block basis, i.e. by using $$p_k = |y_k|^2$$

The present invention may be implemented on averaging basis, for example by applying a filtering between successive (in time) values of $|y_k|^2$:

$$p_k = \text{filtering}(|y_k^j|^2) = \sum_j a_j |y_k^j|^2$$

Where j is the time block index, a block being a set of samples over which the block demodulation, like DFT, processing in the frequency domain, IDFT is applied.

The $a_j$ values are the coefficients of the smoothing time filter.

Knowing the $p_k$ values, the estimation of $P_s$ is based on the following principle: the signal plus thermal noise has a Gaussian-like statistics in the frequency domain, while the interferers are 'peaks', and therefore much more sensitive to a threshold.

The estimation may be performed in an iterative way as follows:

A first power estimate of the signal and thermal noise power $P_s$ is equal to the total received power $P_t$:

$$P_0 = P_t = \frac{1}{M}\sum_k p_k.$$

Where M is the size of the IDFT performed by the IDFT 307.

The powers $p_k$ are then truncated according to a threshold T which is set up with respect to the current power estimate, e.g. T=P$_0$+3 dB=2P$_0$ at first iteration and T=P$_i$+3 dB=2P$_i$ after.

If $p_k \geq T$, then $p_k = T$ and if $p_k < T$, then $p_k = p_k$.

After truncation and an average of the truncated powers, a correction coefficient is applied to the average, the correction assumes that the symbols the powers of which are truncated follow a complex Gaussian law.

The value after correction corresponds to the new power estimate, $P_i$ for the $i^{th}$ iteration.

Figure 5:
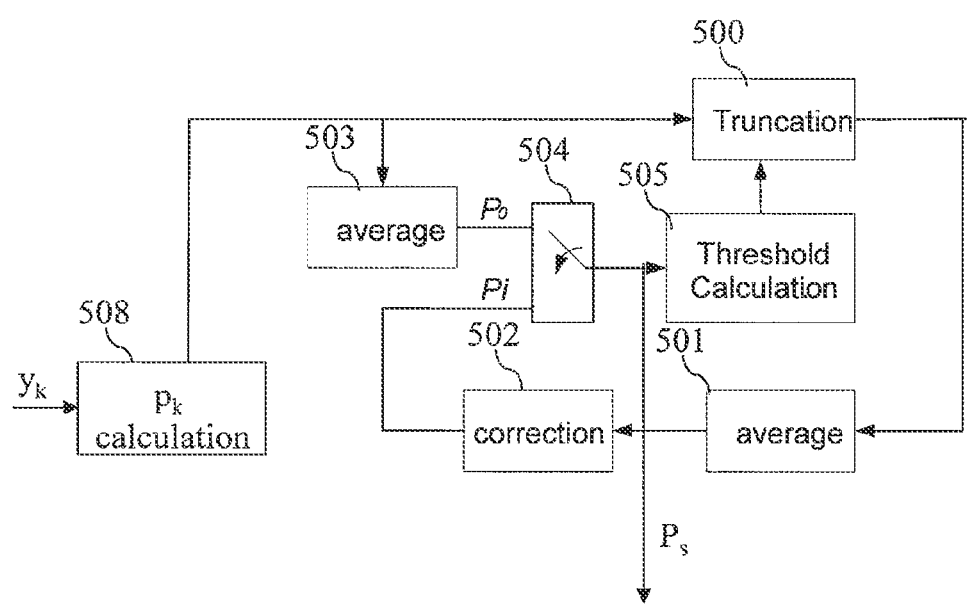
FIG. 5 discloses a block diagram of the signal and thermal noise power estimation module according to the present invention.

An example of above mentioned estimation is given in reference to FIG. 5.

FIG. 5 discloses a block diagram of components of the signal and thermal noise power estimation module according to the present invention.

The adaptive signal and thermal noise power estimation module 305 or 355 comprises a frequency dependant received power module 508 which determines the frequency-dependent received power $p_k$.

The present invention may be implemented on a block basis, i.e. by using $$p_k = |y_k|^2$$

The adaptive signal and thermal noise power estimation module 305 or 355 comprises an averaging module 503 which averages the total received power $P_t$ in order to calculate $P_0$:

$$P_0 = P_t = \frac{1}{M}\sum_k p_k.$$

The power $P_0$ is provided to a switch 504 which provides at the first iteration the power $P_0$, and once the first iteration is executed, a power $P_i$, where i=1 to I−1, I being the total number of iterations that the adaptive signal and thermal noise power determination module 305 or 355 executes. The threshold calculation module 505 determines a first threshold value which is for example equal to $T_0=2P_0$ and at following iterations determines a threshold $T_i=2P_i$.

The threshold value $T_0$ and at following iterations $T_i$ are provided to a truncation module 500 which truncates all signal powers which are upper than the threshold $T_0$ and at following iterations $T_i$ as follows:

if $p_k > T_i$ then $p_k = T_i$.

otherwise $p_k$ value is not modified.

The power values are provided to an averaging module 501 which averages the power values provided by the truncation module 500.

The average value provided by the averaging module 501 is then provided to a correction module 502 which determines and applies a correction coefficient $\delta_i$.

The correction coefficient $\delta_0$ and at following iterations $\delta_i$ is applied to compensate for the power loss generated by the truncation of at least one power to the threshold $T_0$ and at following iterations $T_i$.

The calculation of the correction coefficient assumes that the signal the power of which is truncated is complex Gaussian.

For the i-th iteration, with i=0 to I-1 the correction coefficient $\delta_i$ is determined as follows.

If a signal is complex Gaussian of power Pi, then its power follows an exponential law of probability:

$$p(x)=\lambda'_i e^{-\lambda'_i x}$$

With parameter:

$$\lambda'_i = \frac{1}{P_i}$$

If the threshold $T_i$ is applied to the power of such a signal, then the average power decreases and the average output power $P_{AVi}$ is equal to:

$$P_{AVi} = \int_0^{T_i} x p_i(x) dx + T_i \int_{T_i}^{\infty} p_i(x) dx \Rightarrow P_{AVi} =$$

$$\lambda'_i \int_0^{T_i} x e^{-\lambda'_i x} dx + \lambda'_i T_i \int_{T_i}^{\infty} e^{-\lambda'_i x} dx \Rightarrow$$

$$P_{AVi} = \lambda'_i \left\{ \left[ -\frac{1}{\lambda'_i} x e^{-\lambda'_i x} \right]_0^{T_i} + \frac{1}{\lambda'_i} \int_0^{T_i} e^{-\lambda'_i x} dx \right\} + \lambda'_i T_i \left[ -\frac{1}{\lambda'_i} e^{-\lambda'_i x} \right]_{T_i}^{\infty} \Rightarrow$$

$$P_{AVi} = -T_i e^{-\lambda'_i T_i} + \left[ -\frac{1}{\lambda'_i} e^{-\lambda'_i x} \right]_0^{T_i} + T_i e^{-\lambda'_i T_i} = \frac{1}{\lambda'_i} - \frac{1}{\lambda'_i} e^{-\lambda'_i T_i}$$

And therefore:

$$P_{AVi} = \frac{1}{\lambda'_i} \left( 1 - e^{-\lambda'_i T_i} \right)$$

It can be expressed with respect to $P_i$:

$$P_{AVi} = P_i \left( 1 - e^{\frac{-T_i}{P_i}} \right)$$

The multiplicative corrective term is equal to:

$$\delta_i = \frac{P_i}{P_{AVi}} = \frac{1}{1 - e^{\frac{-T_i}{P_i}}}$$

As $P_{AVi}$ and $T_i$ are known, $P_i$ is derived by solving equation $$P_{AVi} = P_i \left( 1 - e^{\frac{-T_i}{P_i}} \right)$$

for example by applying the fixed-point theorem.

According to a preferred mode of realization of the present invention, a look-up table is used for the calculation of $\delta_i$ or directly $P_i$ from $P_{AVi}$ and $T_i$. In this mode of realization, the above formulas are used to fill in the look-up table.

The corrected signal power is provided to the switching module 504, which provides it to the threshold calculation module 505 instead of the power $P_0$.

For example, the number of iterations may be equal to three to five.

The power $P_s$ is equal to the power $P_i$ determined at last iteration.

FIG. 6a discloses an example of an algorithm executed by a destination according to the first mode of realization of the present invention.

The present algorithm is more precisely executed by the processor 200 of the receiver Rec.

At step S600, the processor 200 commands the synchronisation module 301 to synchronise the DFT module 300 on the received symbols. The received symbols are obtained by transforming the received single carrier signal into received symbols.

At next step S601, the processor 200 commands the DFT module 300 to transform the received symbols from the time domain to the frequency domain into received symbols in the frequency domain $y_k$ where k denotes the index of carrier.

The received symbols in the frequency domain may be represented by:

$$y_k = h_k x_k + v_k$$

At next step S602, the processor 200 commands the signal and thermal noise power estimation module to determine the signal and thermal noise power estimation $P_s$ as disclosed in reference to FIG. 5.

At step S604, the processor 200 commands the threshold based interference estimation module 303 to estimate a narrow band interference variance for each carrier.

For example, the threshold based interference estimation module 303, for each carrier of index k, estimates a rough interferer variance $\omega_k$ that the equalization module uses, the variance is calculated from the received power $p_k$ and from a threshold $T_a$ calculated from the signal and thermal noise power estimation $P_s$.

For example, $T_a = P_s + x$ dB, with x being from 0 to a few dB like at most 10 dB.

For example, $\omega_k = \max(0, p_k - T_a)$.

For example, the rough variance $\omega_k$ may be used for determining a weighting coefficient $\lambda_k$ that is applied to received symbols in the frequency domain $y_k$ prior to or after the equalisation.

It has to be noted here that $\lambda_k$ is a decreasing function of $\omega_k$. As an example, $\lambda_k$ is:

$$\lambda_k = \frac{a}{b + \omega_k}$$

Where, for example, $a = b = 2P_s$

For example, $\lambda_k$ takes only two values, 0 and 1, depending on the values of $\omega_k$, or which is equivalent here, depending on the relative value of $p_k$ with respect to the adaptive threshold $T_a$.

$$\begin{cases} \lambda_k = 0 & \text{if } \omega_k > 0 \text{ i.e. if } p_k > T_a \\ \lambda_k = 1 & \text{elsewhere} \end{cases}$$

$\lambda_k = 0$ corresponds to positions of the narrow band interferer and equalized symbols at these carriers are set to null value.

At step S603, the processor 200 commands the channel estimation module 302 to perform a channel estimation based on the received symbols in the frequency domain provided by step S601. The channel estimation module 302 may perform a channel estimation based on pilot symbols.

At step S605, the processor 200 commands the equalization module 306 to perform an equalization using the information representative of narrow band interference $\lambda_k$ or $\omega_k$ provided by the threshold based interference estimation, using the output of the channel estimation step and using the received symbols in the frequency domain provided by step S601.

The rough variance $\omega_k$ may be used for determining a weighting coefficient $\lambda_k$ that is applied to received symbols in the frequency domain $y_k$ prior to or after the equalisation.

If the equalization is a MMSE equalization:

$$z_k = \frac{h_k^*}{|h_k|^2 + \sigma^2} \lambda_k y_k$$

For example, the rough variance $\omega_k$ may be used in the MMSE equalisation as follows:

$$z_k = \frac{h_k^*}{|h_k|^2 + \sigma^2 + \omega_k} y_k$$

Classical equalization process, in particular MMSE, assumes a perfect knowledge of the channel and a perfect knowledge of the narrow band interferer variance. The narrow band interference variances are simply estimated by the present invention. However, the channel estimation process is sensitive to the interferers. It must be noted that the interferer power can be much larger than the signal power.

At next step S606, an IDFT transform is performed on samples provided by the equalization step S605.

FIG. 6b discloses an example of an algorithm executed by a destination according to the second mode of realization of the present invention.

The present algorithm is more precisely executed by the processor 200 of the receiver Rec.

At step S650, the processor 200 commands the synchronisation module 351 to synchronise the DFT module 350 on the received symbols. The received symbols are obtained by transforming the received single carrier signal into received symbols.

At next step S651, the processor 200 commands the DFT module 350 to transform the received symbols from the time domain to the frequency domain into received symbols in the frequency domain $y_k$ where k denotes the index of carrier.

The received symbols in the frequency domain may be represented by:

$$y_k = h_k x_k + v_k$$

At next step S652, the processor 200 commands the signal and thermal noise power estimation module to determine the signal and thermal noise power estimation $P_s$ as disclosed in reference to FIG. 5.

At step S653, the processor 200 commands the threshold based interference estimation module 353 to estimate a narrow band interference variance for each carrier.

For example, the threshold based interference estimation module 353, for each carrier of index k, estimates a rough interferer variance $\omega_k$ that the equalization module uses, the variance is calculated from the received power $p_k$ and from a threshold $T_a$ calculated from the signal and thermal noise power estimation $P_s$.

For example, $T_a = P_s + x$ dB, x is from 0 to a few dB like at most 10 dB.

For example, $\omega_k = \max(0, p_k - T_a)$.

For example, the rough variance $\omega_k$ may be used for determining a weighting coefficient $\lambda_k$ that is applied to received symbols in the frequency domain $y_k$ prior to or after the equalisation.

It has to be noted here that $\lambda_k$ is a decreasing function of $\omega_k$. As an example, $\lambda_k$ is:

$$\lambda_k = \frac{a}{b + \omega_k}$$

Where, for example, $a = b = 2P_s$

For example, $\lambda_k$ takes only two values, 0 and 1, depending on the values of $\omega_k$, or which is equivalent here, depending on the relative value of $p_k$ with respect to the adaptive threshold $T_a$.

$$\begin{cases} \lambda_k = 0 & \text{if } \omega_k > 0 \text{ i.e. if } p_k > T_a \\ \lambda_k = 1 & \text{elsewhere} \end{cases}$$

$\lambda_k = 0$ corresponds to positions of the narrow band interferer and equalized symbols at these positions are set to null value.

At step S654, the processor 200 commands the adaptive threshold determination and truncation module 358 to determine from the signal and thermal noise power estimation $P_s$ another adaptive threshold and to perform a truncation on the received symbols in the frequency domain.

The adaptive threshold determination and truncation module 358 determines another threshold $T_d$ as equal, for example to the power $P_s$ determined plus four dB.

The threshold $T_d$ is then used by the adaptive threshold determination and truncation module 358 to truncate the amplitudes of the received symbols in the frequency domain according to the following rule:

$$y_k = \rho_k e^{i\phi_k} \text{ if } \rho^2_k < T_d$$

$$y_k = \sqrt{T_d} e^{i\phi_k} \text{ if } \rho_k^2 \geq T_d$$

where i is the square root of '−1' in both above mentioned formulas.

At step S655 the processor 200 commands the channel estimation module 352 to perform a channel estimation on the received symbols processed by the adaptive threshold determination and truncation module 358.

At next step S656, the processor 200 commands the equalization module 356 to perform an equalization using the information representative of narrow band interference $\lambda_k$ or $\omega_k$ provided by the threshold based interference estimation, using the output of the channel estimation step and using the received symbols processed by the adaptive threshold determination and truncation step S654.

The rough variance $\omega_k$ may be used for determining a weighting coefficient $\lambda_k$ that is applied to received symbols in the frequency domain $y_k$ prior to or after the equalisation.

If the equalization is a MMSE equalization:

$$z_k = \frac{h_k^*}{|h_k|^2 + \sigma^2} \lambda_k y_k$$

For example, the rough variance $\omega_k$ may be used in the MMSE equalisation as follows:

$$z_k = \frac{h_k^*}{|h_k|^2 + \sigma^2 + \omega_k} y_k$$

At next step S657, an IDFT transform is performed on samples provided by the equalization step S656.

Naturally, many modifications can be made to the embodiments of the invention described above without departing from the scope of the present invention.

The invention claimed is:

1. A method executed by a receiver for cancelling a narrow band interference in a single carrier signal, comprising:
   receiving the single carrier signal and transforming the single carrier signal into received symbols,
   transforming the received symbols from the time domain to the frequency domain into received symbols in the frequency domain,
   determining a signal and thermal noise power estimation based on the received symbol powers in the frequency domain,
   estimating variances of the narrow band interference from the signal and thermal noise power estimation and the received symbol powers in the frequency domain, and
   equalizing the received symbols in the frequency domain or symbols derived from the received symbols in the frequency domain taking into account the estimate of the variances of the narrow band interference.

2. The method according to claim 1, wherein the method further comprises:
   determining weighting coefficients which are dependant of the variances of the narrow band interference, the weighting coefficients being decreasing functions of the variances of the narrow band interference,
   equalizing the received symbols in the frequency domain taking into account the weighting coefficients.

3. The method according to claim 2, wherein the weighting coefficients are equal to one or null value, which depends on the estimated variances of the narrow band interference.

4. The method according to claim 1, wherein the method further comprises:
   determining a first threshold based on the signal and thermal noise power, the first threshold being used for estimating the variances of the narrow band interference.

5. The method according to claim 1, wherein the method further comprises:
   estimating the frequency-dependent received powers of received symbols in the frequency domain,
   determining iteratively the signal and thermal noise power from the estimated frequency dependent receive powers.

6. The method according to claim 5, wherein the adaptive signal and thermal noise power iteratively determined is determined by:

executing a first averaging of the total received powers of the received symbols in the frequency domain,
determining, at a first iteration, a temporary threshold based on the averaged total received power,
truncating all powers of the received symbols in the frequency domain which are higher than the determined temporary threshold at the first iteration,
executing a second averaging of the truncated powers,
correcting the second average by a correction coefficient,
determining at a following iteration a following temporary threshold based on the corrected average,
truncating all powers of the received symbols in the frequency domain which are higher than the following temporary threshold,
executing a third averaging of the truncated powers, and correcting the third average by a correction coefficient,
wherein the temporary threshold determination, the truncating, the third averaging and the correcting are executed a predetermined number of times.

7. The method according to claim 6, wherein the correction coefficients are calculated by:
   deriving a power of which the symbols, the powers of which are truncated, can be assumed to be a complex Gaussian, and
   calculating the correction coefficients as a ratio of the derived power and the third average of the truncated powers.

8. The method according to claim 6, wherein the correction coefficients are determined using a lookup table.

9. The method according to claim 1, wherein the method further comprises the step of performing a channel estimation based on the received symbols in the frequency domain.

10. The method according to claim 1, wherein the method further comprises:
    determining a second threshold based on the signal and thermal noise power estimate,
    truncating the amplitudes of the received symbols in the frequency domain at the determined second threshold, the truncated received symbols in the frequency domain being the symbols derived from the received symbols.

11. The method according to claim 10, wherein the channel estimation is performed on the truncated received symbols in the frequency domain.

12. The method according to claim 1, wherein the single carrier signal is a single carrier orthogonal frequency division multiplex modulation signal.

13. A device for cancelling a narrow band interference in a single carrier signal, wherein the device is included in a receiver and comprises:
    a processor; and
    a memory storing a program which, when executed by said processor, performs a process including,
        receiving the single carrier signal and transforming the single carrier signal into received symbols,
        transforming the received symbols from the time domain to the frequency domain into received symbols in the frequency domain,
        determining a signal and thermal noise power estimation based on the received symbol powers in the frequency domain,
        estimating variances of the narrow band interference from the signal and thermal noise power estimation and the received symbol powers in the frequency domain, and
        equalizing the received symbols in the frequency domain or symbols derived from the received symbols in the frequency domain taking into account the estimate of the variances of the narrow band interference.

14. A non-transitory computer readable medium on which is stored a program comprising instructions or portions of code which when executed by a computer performs the method according to claim 1.

* * * * *